United States Patent [19]

Roberts et al.

[11] Patent Number: 4,686,094

[45] Date of Patent: Aug. 11, 1987

[54] TREATMENT OF PYROPHORIC ELEMENTAL PHOSPHORUS-CONTAINING MATERIAL

[75] Inventors: Auston K. Roberts, Chino; William E. Trainer, Anaheim; Steve Nakamura, Los Alamitos; Leon C. Duffin, Cudahy, all of Calif.; David L. Biederman, Columbia, Tenn.

[73] Assignee: Stauffer Chemical Company, Westport, Conn.

[21] Appl. No.: 894,529

[22] Filed: Aug. 8, 1986

[51] Int. Cl.[4] ..................... C01B 25/01; C01B 25/02; C01B 25/04

[52] U.S. Cl. .................................. 423/322; 423/309; 423/317; 423/323

[58] Field of Search ............... 423/322, 323, 317, 308, 423/309

[56] References Cited

U.S. PATENT DOCUMENTS

| | | | |
|---|---|---|---|
| 1,848,295 | 3/1932 | Ipatiew | 423/317 |
| 1,895,329 | 1/1933 | Ipatiew et al. | 423/317 |
| 1,940,758 | 12/1933 | Lehrecke | 423/304 |
| 2,708,620 | 5/1955 | Winnicki | 423/317 |
| 2,857,246 | 10/1958 | Malowan | 423/309 |
| 3,084,029 | 4/1963 | Barber et al. | 23/223 |
| 3,104,952 | 9/1963 | Hartig | 23/293 |
| 3,241,917 | 3/1966 | Lapple | 23/165 |
| 3,436,184 | 4/1969 | Hinkelein | 423/322 |
| 3,442,621 | 5/1969 | Hinkebein | 23/223 |
| 3,615,218 | 10/1971 | Post et al. | 23/223 |
| 3,717,451 | 2/1973 | Severns et al. | 71/33 |
| 4,081,333 | 3/1978 | Holmes et al. | 203/86 |
| 4,204,925 | 5/1980 | Coll-Palagos | 204/152 |
| 4,309,394 | 1/1982 | Hudsen | 423/317 |
| 4,372,929 | 2/1983 | Barber | 423/323 |
| 4,383,847 | 5/1983 | Barber | 71/34 |
| 4,451,277 | 5/1984 | Barber | 71/36 |
| 4,481,176 | 11/1984 | Dodson et al. | 423/322 |
| 4,492,627 | 1/1985 | Crea | 209/3 |
| 4,603,039 | 7/1986 | Kuxdort et al. | 423/304 |
| 4,608,241 | 8/1986 | Barber | 423/317 |

FOREIGN PATENT DOCUMENTS

| | | |
|---|---|---|
| 524289 | 8/1940 | United Kingdom . |
| 801246 | 9/1958 | United Kingdom . |
| 835859 | 5/1960 | United Kingdom . |
| 1133015 | 11/1968 | United Kingdom . |
| 697401 | 11/1979 | U.S.S.R. . |

OTHER PUBLICATIONS

Chemical Abstracts, vol. 97, 25820h (1982).
Chemical Abstracts, vol. 67, 66158x (1967).
Chemical Abstracts, vol. 94, 105859f (1981).
Chemical Abstracts, vol. 98, 128600m (1983).
Chemical Abstracts, vol. 92, 43923v (1980).
Chemical Abstracts, $221^3$ (1937).
Chemical Abstracts, vol. 30, $7787^9$.
Chemical Abstracts, $3678^8$ and $3678^5$ (1934).
Chemical Abstracts, $1594^3$ (1934).
Chemical Abstracts, vol. 82, 19061k (1975).
Chemical Abstracts, vol. 96, 37770j (1982).
"A Waste Recovery Story", by J. C. Barber et al., Chemtech, May 1986, pp. 298–302.

Primary Examiner—Gregory A. Heller
Attorney, Agent, or Firm—Richard P. Fennelly

[57] ABSTRACT

Pyrophoric elemental phosphorus-containing material, e.g., solid waste containing high levels of elemental phosphorus ($P_4$), is treated by contact with an oxygen-containing gas, such as air, to reduce the amount of elemental phosphorus contained therein while it is otherwise protected from contact with oxygen in the air by being blanketed by a non-flammable fluid (e.g., while under an aqueous protective layer). This renders the material less pyrophoric and also enables the recovery of phosphorus values therefrom, e.g., in the form of a weak phosphoric acid solution. This treatment, for example, mobilizes highly pyrophoric solid waste into a more flowable sludge or mud form while rendering it substantially more non-pyrophoric.

14 Claims, 1 Drawing Figure

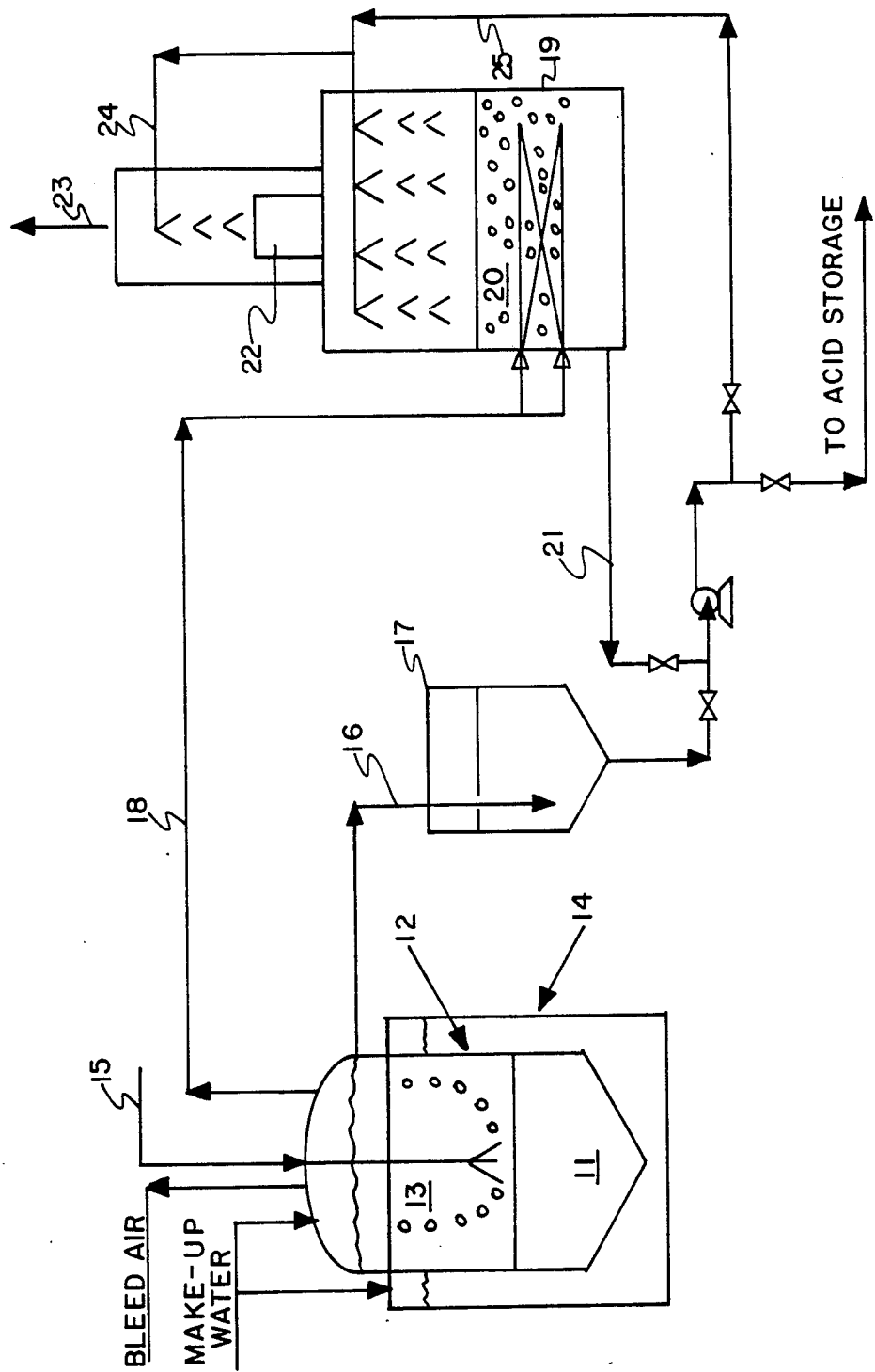

TREATMENT OF PYROPHORIC ELEMENTAL PHOSPHORUS-CONTAINING MATERIAL

BACKGROUND OF THE INVENTION

1. Field of the Invention

The present invention relates to a process for the treatment of pyrophoric elemental phosphorus (e.g., $P_4$ or $P_2$)-containing material.

2. Description of the Prior Art

The treatment and disposal of pyrophoric elemental phosphorus-containing material is of serious concern to persons of ordinary skill in the art. Since such material is highly pyrophoric, due to the pyrophoric nature of the elemental phosphorus contained therein, stringent precautions need to be taken to protect the material from contact with oxygen in the atmosphere (e.g., by blanketing the material with a protective layer of water). Examples of such pyrophoric elemental phosphorus-containing materials are described hereinafter. Contact of such pyrophoric materials with the atmosphere will cause spontaneous fire which is extremely difficult to suppress due to the very high temperatures produced. Hence, in accordance with the present invention, the necessity of a protective blanket (e.g., of inert gas or, preferably, water) over the material, even though the present invention involves contacting or sparging of the material, while so protected, with an oxygen-containing gas.

For example, of concern to persons of ordinary skill in the art is the problem of safely disposing of the extremely pyrophoric, substantially solid $P_4$-containing waste which is usually found in appropriate storage tanks under an aqueous protective layer. This solid material often forms from the more flowable $P_4$-sludge to be described hereinafter if it is allowed to stand for a duration of time. Such substantially solid waste material generally has a very high $P_4$ content (e.g., greater than about 90%). Conventional means for removal of such a waste product has involved the laborious fracturing (e.g., by use of a jackhammer) of the solid formation, while under a protective water cover, and its subsequent removal in small containers, also while being shielded from contact with the air.

Also, the production of elemental phosphorus, for example, by the smelting of phosphate rock, often results in the production of a certain quantity of a more fluid sludge which comprises elemental phosphorus droplets or globules, solid impurities and water. The amount of phosphorus sludge (e.g., $P_4$-sludge) that is produced will vary depending upon numerous factors such as the initial composition of the rock charge, and the operating conditions and the design of the furnace. Phosphorus sludge can contain anywhere from about 5%–90% or more by weight of elemental phosphorus. The phosphorus sludge that is produced can vary from about 10 to about 60 weight percent or more of the furnace output of elemental phosphorus.

As is known in the art, the sludge that is produced is an undesirable by-product of the process. Since the sludge contains elemental phosphorus values, it is desirable that it be treated to recover the phosphorus values in some usable form. Phosphorus is pyrophoric. This quality, as mentioned before, also makes the sludge by-product quite dangerous since exposure to air can result in sudden pyrophoric incidents and lead to fire and possible damage to property and/or injury to persons. Therefore, a need has existed in the art for ways in which this type of sludge can be treated to either render it less pyrophoric and/or to recover phosphorus values therefrom.

Various methods have been proposed to treat phosphorus sludge in order to either convert the phosphorus therein to a more desirable form and/or to recover phosphorus values therefrom. Among these are such physical methods as filtration, distillation, stirring and settling, vibration, centrifuging, briquetting, and the like. There have also been various chemical innovations for recovering or treatment of phosphorus in sludge in the literature.

For example, U.S. Pat. No. 3,084,029 disclosed that when small amounts of dispersing agents are introduced into the sludge and the pH of the sludge is adjusted to about 6, the viscosity and stickiness of the sludge was reduced.

U.S. Pat. No. 3,104,952 proposed mixing the sludge with phosphoric acid and steam distilling the mixture in a non-oxidizing atmosphere.

U.S. Pat. No. 3,442,621 proposed treatment of sludge with chromic acid and the coalescing of the phosphorus in the sludge in the presence of an acidulating agent in order to decrease the phosphorus content of the sludge.

U.S. Pat. No. 3,615,218 taught recovery of phosphorus values from sludge by admixing the sludge with carbon disulfide.

The procedures shown in each of the previously described U.S. Patents are distinctly different from the approach utilized in connection with the present invention.

An oxidizing agent was proposed for use in U.S. Pat. No. 3,436,184 to decrease the phosphorus content of the sludge. Although this patent taught that any oxidizing agent could be used, it named only oxidizing agents which were either chemical compounds or, in the case of the halogens, elements. The disclosure of this patent contained no clear teaching or suggestion of using the particular type of treatment agent (i.e., an oxygen-containing gas) that is the subject of the present invention.

More recently, U.S.S.R. Pat. No. 697,401 teaches the treatment of phosphorus-containing sludges in a fluidized bed at high temperatures. This patent generally teaches heating the "P-containing sludge" at temperatures of from 44°–90° C. while being thoroughly mixed by bubbling an oxygen-containing gas through it for 30–60 minutes. The resulting composition is then treated in a fluidized bed at 120°–180° C. for 1–2.5 hours with a fluidizing agent velocity of 3–5 meters per second. This reference is utterly silent regarding blanketing its sludge layer from contact with oxygen in the atmosphere. Example 2, which relates more specifically to treatment with an oxygen-containing gas, first "neutralizes" its waste water product with milk of lime to yield a lime sludge which is then heated and treated with the oxygen-containing gas. The present invention appears to differ from this disclosure in that the present process is practiced while the elemental phosphorus-containing material (which is not first neutralized) is otherwise protected from contact with oxygen in the atmosphere by being blanketed with a non-flammable fluid (e.g., by being protected with a blanket layer of water).

SUMMARY OF THE PRESENT INVENTION

The present invention relates to the treatment of pyrophoric elemental phosphorus-containing material by contacting the material with an oxygen-containing gas, preferably at ambient temperature when the contacting is begun, while the material is otherwise protected from direct contact with the atmosphere by being blanketed with a non-flammable fluid (e.g., an inert gas or suitable liquid blanketing agent). As used herein, the term "phosphorus-containing material" is intended, for example, to cover both the pyrophoric sludge and substantially solid elemental phosphorus-containing products described before as well as the metal structure of storage tanks contaminated with elemental phosphorus from either sludge or solid waste held therein. Also intended to be included are other materials, e.g., $P_4$-contaminated earth, $P_4$ in water, etc., which are highly pyrophoric because of their elemental phosphorus content.

DETAILED DESCRIPTION OF THE PRESENT INVENTION

A suitable storage tank, e.g. a railroad car tank or other suitable storage tank, can hold a waste layer comprising the elemental phosphorus-containing material (i.e., the "$P_4$-sludge" or the substantially more solid $P_4$-containing material). This layer is covered by a suitable blanketing layer so that the elemental phosphorus within the layer will be shielded from the air so as to avoid any undesired pyrophoric incidents.

In accordance with the present invention, the suitable blanketing agent which protects the elemental phosphorus-containing material from contact with oxygen in the air is a non-flammable fluid. Inert gases, such as nitrogen can be used. However, it is highly preferred to use a non-flammable liquid in which $P_2O_5$ values are soluble to allow for later recovery of $P_2O_5$ values resulting from the treatment of the elemental phosphorus-containing material with the oxygen-containing gas. Water is especially preferred since it is of low cost and readily available, and it acts as an excellent heat sink to dissipate the intense heat generated beneath the fluid blanketing layer when the oxygen in the gas contacts the elemental phosphorus contained in the material. $P_2O_5$ values are soluble in water producing a weak phosphoric acid solution initially which has value as a potential recycle stream in commercial operations.

In accordance with a preferred embodiment of the present invention, a suitable sparging apparatus is placed into contact with or into the phosphorus-containing material layer, if possible (while the layer is blanketed), and either air or other oxygen-containing gas is metered through the sparging apparatus under controlled rates, e.g., through appropriate valve means, so as to treat the material with the oxygen-containing gas. The higher the elemental $P_4$ level in the material to be treated, the more likely the person of ordinary skill in the art may need to initially dilute the oxygen content of the gas used in the sparging and/or to use lower flow rates of the gas. The contacting takes place at essentially ambient temperatures when begun. In other words, external heat need not be applied. However, in accordance with conventional practice, it can be utilized by heating the $P_4$-material to a high enough temperature (44.2° C. or above) to make it molten to render it mobile.

With regard to materials which consist substantially of only $P_4$, it may be desirable to initiate the sparging with a gas stream formed by mixing air and nitrogen gas from a source of liquid nitrogen. As the sparging is performed and as elemental phosphorus values in the material in the presence of water are converted to less pyrophoric forms (e.g., to phossy water), the oxygen content of the gas stream can gradually be increased by elimination of the nitrogen gas stream and/or the flow rates of the gas stream can be increased. Continued sparging can be conducted using gradually more oxygen-enriched streams where pure oxygen is mixed with the air in gradually increasing amounts. Finally, when the waste material has been more substantially converted over to a substantially reduced pyrophoric form, a more pure oxygen stream can be used. In regard to the substantially solid waste material described before, it has been found that the present invention allows one to both mobilize such material into a more fluid sludge or mud form while simultaneously converting the elemental phosphorus to a substantially non-pyrophoric material in the presence of the protective water covering (e.g., which becomes phossy water). The oxygen content of the gas used can vary widely (e.g., from about 1% to 100% depending on the nature of the elemental phosphorus material treated, the type and depth of blanketing fluid, etc). Substantially pure oxygen has been effectively used to decontaminate $P_4$-containing metal from storage tanks holding $P_4$-containing waste material.

In one embodiment the phossy water in contact with the waste from the tank can be pumped through a line using a suitable pump while the sparging of the sludge takes place. The resulting composition which is fed via a suitable line to a holding tank is a weak phosphoric acid composition. A recycle line enables the maintenance of a desired water cap level in the storage tank. It is possible, in accordance with the present invention, for the weak phosphoric acid solution resulting from the oxygen treatment of phosphorus in the aqueous layer to be thereafter treated with caustic, for example, to form such products as TSP (trisodium phosphate) and STPP (sodium tripolyphosphate).

In one embodiment of the present invention, it has been found advantageous to pre-treat the pyrophoric $P_4$-containing waste, while it is under a water blanket, with sunlight (by removal of the top of the storage tank holding the material) to achieve a partial reduction of the pyrophoric nature of the material prior to use of the present process.

The Drawing which is provided herein represents a schematic diagram of a phosphoric acid production facility utilizing an elemental phosphorus sludge starting material. The sludge 11 is held in tank 12 under an appropriate water cover 13. The tank 12 is positioned within a water filled revetment 14 for protection against sludge leakage and for the removal of excess heat of combustion resulting from the present process. A sparger gas line 15 feeds an oxygen-containing gas (e.g., air, air/$N_2$, $O_2$) into the liquid cover 13 to appropriate sparger nozzle means to provide oxygen to the sludge layer 11 while it is beneath the protective water cover 13. This treatment results in the production of a dilute phosphoric acid solution in the liquid cover 13 as the treatment proceeds. A weak phosphoric acid solution is drawn off through line 16 to a recirculation tank 17. Line 18 serves to remove residual $P_2O_5$ gas to scrubber tank 19 where they can be used to sparge liquid layer 20 of weak acid. Line 21 can be used to convey acid liquid to storage. A suitable fiber mist eliminator 22 can be provided to scrub gases leaving at 23. Lines 24 and 25 are used to spray weak acid for its saturation and final scrubbing.

In a preferred embodiment the sparger nozzle is mounted on a traverse rod for up-and-down movement in the center of the tank. The material of construction is of stainless steel having a high nickel content. The end of the nozzle is of bulbous shape with a plurality of perforations to allow for passage of the oxygen-containing gas therethrough. A hat-like skirt is provided behind the bulb end and is welded thereto to aid in the breaking up of the bubbles that result when the gas is provided to the phosphorus layer. The skirt has slots on its surface.

The present invention is illustrated by the following Examples which are merely presented for purposes of illustration and which should, therefore, not be construed in a limiting fashion.

EXAMPLE 1

Two storage tanks having a capacity of 27,506 gallons were each treated in accordance with the present invention. The storage tanks each contained a substantially solid elemental phosphorus-containing material (e.g., about 99% $P_4$ content) in the following respective amounts: about 15% solids and about 85% water.

Sparging of the $P_4$ material through the water covering with atmospheric air was initiated gradually through a sparger until it was possible to operate at about 40 psi at a flow rate of about 20 ft$^3$/min. for about six months. After this period of time, about 90%-95% of the sludge has been processed into a dilute phosphoric acid solution. There was negligible amounts of $P_4$ scale and pyrophoric sludge in the actual areas of the tank contacted by the treatment. At no time was any of the material (either liquid or solids) removed from the tanks. Only fresh water was added on a daily basis to replace losses due to evaporation.

The contacting took place while the ambient temperature of the $P_4$ material was around 30° C. due to its outdoor location inside metal storage tanks in a relatively hot and sunny climate in Southern California.

EXAMPLE 2

An elemental phosphorus storage tank having a capacity of 18,270 gallons had accumulated about 4,600 gallons of substantially solid $P_4$ waste (about 99% $P_4$ content) covered with a layer of about 13,700 gallons of protective water during 35 years of service. Sporadic air sparging of the unrecoverable $P_4$ material through the water layer was performed for about 6 months. The tank contained three feet of side wall plus a cone of hot sludge (about 99% $P_4$ content) having a volume of about 3,300 gallons. The tank was then treated to about 40 hours per week of pure oxygen sparging for about 4 weeks. By using a gradually increased volume per unit time (min.) of compressed oxygen (from 20 ft$^3$ to about 120 ft$^3$), it was possible to pump down the phossy water to the cone and to remove the sides of the tank without smoke or fire being generated. Prior wall cutting on vertical tank sections had required small (e.g., 6 inch) cuts with accompanying torch burnoff of residual $P_4$ contamination before removal. Using the procedure of the present invention, it was possible for the side sections to be removed by two men in four hours. The storage tank was reduced to a cone containing a mixture of sludge ($P_4$ content: about 5%) and a phossy water layer of about 900 gallons.

The foregoing illustrates certain embodiments of the present invention and should not be construed in a limiting fashion. The scope of protection is set forth in the claims which follow.

We claim:

1. A method of treating pyrophoric elemental phosphorus-containing material which comprises contacting the material with an oxygen-containing gas to convert it to a substantially less pyrophoric form while it is otherwise protected from direct contact with oxygen in the atmosphere by being blanketed with a non-flammable fluid.

2. A method as claimed in claim 1 wherein the gas is air.

3. A method as claimed in claim 1 wherein the non-flammable fluid is a liquid in which $P_2O_5$ values are soluble.

4. A method as claimed in claim 1 wherein the oxygen content of the gas is from about 1% to about 100%.

5. A method as claimed in claim 3 wherein the oxygen content of the gas is from about 1% to about 100%.

6. A method as claimed in claim 1 wherein the material is at essentially ambient temperature when the contacting is begun.

7. A method as claimed in claim 3 wherein the material is at essentially ambient temperature when the contacting is begun.

8. A method as claimed in claim 4 wherein the material is at essentially ambient temperature when the contacting is begun.

9. A method as claimed in claim 5 wherein the material is at essentially ambient temperature when the contacting is begun.

10. A method as claimed in any one of claims 1-9 wherein the material is covered by a protective layer of water to protect it from contact with oxygen in the atmosphere.

11. A method as in claim 10 wherein the product comprising an aqueous $P_2O_5$ solution resulting from the admixture of the water and the product of the contacting of the material with the gas is recovered.

12. A method as claimed in claim 11 wherein the recovered product is treated with caustic.

13. A method as in any one of claims 1-9 wherein the material is substantially solid elemental phosphorus-containing material having a $P_4$ content of above about 90%.

14. A method as claimed in claim 1 wherein the material is pre-treated by exposure to sunlight.

* * * * *